United States Patent
Jones

[11] Patent Number: 6,122,253
[45] Date of Patent: Sep. 19, 2000

[54] ATM NETWORK SWITCH WITH CONGESTION CONTROL

[75] Inventor: Trevor Jones, Maldon, United Kingdom

[73] Assignee: General Data Comm Inc., Waterbury, Conn.

[21] Appl. No.: 08/973,441

[22] PCT Filed: Jun. 5, 1996

[86] PCT No.: PCT/US96/08907

§ 371 Date: Dec. 4, 1997

§ 102(e) Date: Dec. 4, 1997

[87] PCT Pub. No.: WO96/39763

PCT Pub. Date: Dec. 12, 1996

[30] Foreign Application Priority Data

Jun. 5, 1995 [GB] United Kingdom ............ 9511314

[51] Int. Cl.[7] .................. H04J 3/14; H04J 3/16; H04J 3/22; H04J 3/24
[52] U.S. Cl. .............. 370/235; 370/252; 370/399; 370/412; 370/129
[58] Field of Search .............. 370/252, 229, 370/230, 235, 412, 413, 414, 415, 416, 417, 418, 428, 429, 231, 232, 236, 395, 398, 399

[56] References Cited

U.S. PATENT DOCUMENTS

| | | | |
|---|---|---|---|
| 5,550,823 | 8/1996 | Irie et al. | 370/412 |
| 5,787,073 | 7/1998 | Ikeda | 370/236 |
| 5,790,522 | 8/1998 | Fichou et al. | 370/236 |
| 5,838,677 | 11/1998 | Kozaki et al. | 370/412 |

*Primary Examiner*—Ricky Ngo
*Attorney, Agent, or Firm*—David P. Gordon; David S. Jacobson; Thomas A. Gallagher

[57] ABSTRACT

An ATM network switch (11) including a buffer (24) for buffering the flow of ATM cells and a congestion control mechanism (23). The congestion control mechanism establishes a value Max, representing the maximum permissible number of ATM cells which may be stored in the buffer. The switch includes a predetermined offset value K for determining the maximum occupancy of the buffer for the connection. The congestion control mechanism determines the total number of cells TSC currently stored in the buffer and the number of cells VcCnt stored for a given connection, determines the remaining capacity BS of the buffer, calculates an adjusted value of Max as a function of TSC and BS, compares the adjusted value Max' with VcCnt, and discards the cell if VcCnt is greater than the adjusted value.

24 Claims, 3 Drawing Sheets

ATM NETWORK SWITCH WITH CONGESTION CONTROL

FIELD OF THE INVENTION

This invention relates to an Asynchronous Transfer Mode (ATM) network switch having a buffer for buffering the flow of ATM cells and a congestion control mechanism associated therewith. The invention also relates to a method of controlling congestion in an ATM network switch.

BACKGROUND TO THE INVENTION

Intelligent cell discard schemes have been proposed to allow better throughput in ATM cell switches. ATM cells may either carry individual data or be part of a segmented larger data packet in accordance with AAL5 (ATM Adaptation Layer 5). Individual data cells may be discarded at random when a switch is congested. However, for an AAL5 connection, all ATM cells which comprise a single packet must be delivered through the network to the destination without loss. If a single cell is lost within a packet, the destination will not be able to reconstitute (or reassemble) the packet, and all the other cells received within that packet will be worthless and must be discarded. It will be noted that packets may comprise dozens, or even hundreds of cells.

Intelligent cell discard schemes, often referred to as "Early packet (or Cell) Discard", detect the end of a packet by reading the 3-bit Payload Type (PT) field value of 0X1 (hexadecimal 1) in the ATM cell header, and then setting a flag. When the next user data cell arrives, with a PT value of 0X0 (hexadecimal 0), the level of congestion in the switch is assessed to determine whether there is capacity to accept the entire packet without cell loss. A flag is then set to indicate either acceptance of the whole packet, or that the whole packet is to be discarded. In this way, individual cells within a packet should not be discarded.

Switches become congested when the total input bandwidth exceeds the output bandwidth at a particular switch queuing point. In a typical switch, for example of the type described and claimed in our earlier UK Patent Applications 9507454.8, 9509483.5 and 9509484.3, congestion may occur on the receive side (input to the switch fabric) if the switch fabric is congested and will not allow further cells to be input. It may also occur on the transmit side (output from the switch fabric) where cells arrive faster than they can be transmitted.

SUMMARY OF THE INVENTION

It is therefore an object of the invention to provide an apparatus and a method for assessing current congestion level and determining when to discard a packet (or individual ATM cell).

An ATM network switch according to the invention includes a buffer for buffering the flow of ATM cells and a congestion control mechanism which includes means for allocating buffer space to each virtual connection and means for determining the amount of buffer space available for each virtual connection.

According to one embodiment of the invention, the congestion control mechanism includes means for storing a predetermined value Max, representing the maximum permissible number of ATM cells which may be stored in the buffer for each virtual connection (VC) through the switch, and a predetermined offset value K, which determines the maximum occupancy of the buffer for the VC; means responsive to the arrival of a new ATM cell at the buffer means for determining the total number of cells TSC currently stored in the buffer and the number of cells VcCnt stored for the respective VC for the cell; means for determining the remaining capacity BS of the buffer; calculating means for calculating an adjusted value Max' of Max in accordance with the formula:

$$\text{Max}' = \text{Max} \times \left(1 - \frac{TSC}{BS + K}\right);$$

and means for comparing Max' with VcCnt and for discarding the cell if VcCnt is greater than or equal to Max'.

According to another embodiment of the invention, the congestion control mechanism includes means for storing an EFCI (Explicit Forward Congestion Indication) Threshold value for each virtual connection (VC) through the switch, and a predetermined offset value K, which determines the maximum occupancy of the buffer for the VC; means responsive to the arrival of a new ATM cell at the buffer for determining the total number of cells TSC currently stored in the buffer and the number of cells VcCnt stored for the respective VC for the cell; means for determining the remaining capacity BS of the buffer; calculating means for calculating an adjusted value EFCIThr' of the EFCI Threshold EFCIThr in accordance with the formula:

$$EFCIThr' = EFCIThr \times \left(1 - \frac{TSC}{BS + K}\right);$$

and means for comparing EFCIThr' with VcCnt and for setting an EFCI bit in the ATM cell header of said cell if VcCnt is greater than or equal to EFCIThr'.

Preferably, the switch includes both of the congestion control mechanisms described above.

The invention also provides a method of controlling congestion in an ATM network switch having a buffer for buffering the flow of ATM cells therethrough, the method including discarding cells according to the congestion control mechanism described above and setting EFCI bits according to the congestion control mechanism described above. Non user data cells are not arranged in packets and may therefore be discarded on an individual basis.

The congestion control mechanism may be implemented on each side of the switch fabric in a network switch, at each point where congestion may occur.

The algorithm for discarding cells allocates a maximum number (Max) of stored cell positions in the buffer for each VC, this number being reduced as the buffer fill increases as cells are stored on other connections. The offset parameter K, which may be positive or negative, can be set to determine the level of buffer fill at which all cells are discarded. The value will be set differently depending on the class of traffic. For low priority traffic classes, such as UBR (Uncommitted Bit Rate), K may be set to zero, for example, so as not to allow any UBR cells into the buffer when it is half full or more. A negative value of K would cause cell discarding at less than half full. The Max parameter may, however, be set quite high to allow plenty of buffering when space is available. For high priority traffic classes, such as CBR (Constant Bit Rate), Max may be set lower, to reflect the fact that CBR cells are treated with top priority and are sensitive to transit delay, and hence buffer size. On the other hand, the K parameter would be set large to allow CBR cells to be stored even when there is a high level of lower priority traffic.

The EFCI bit in the cell header may be set by a congested ATM switch as part of an end-to-end flow control mechanism, to slow down the source at times of congestion. The EFCI Threshold parameter is configurable for each connection at a predetermined fraction of the maximum level at which discard may occur (typically this would be 50%). The EFCI test may be performed for each cell arriving in the buffer, and the Payload Type EFCI bit is set for all user data cells when the threshold is exceeded. An option to discard CLP1 cells (CLP is Cell Loss Priority, and 1 denotes low priority) may also be set per connection when the EFCI level is reached. For AAL5 connections, this feature is disabled for the user data cells. Additional objects and advantages of the invention will become apparent to those skilled in the art upon reference to the detailed description taken in conjunction with the provided figures.

DETAILED DESCRIPTION OF THE ILLUSTRATED EMBODIMENTS

Figure 1:
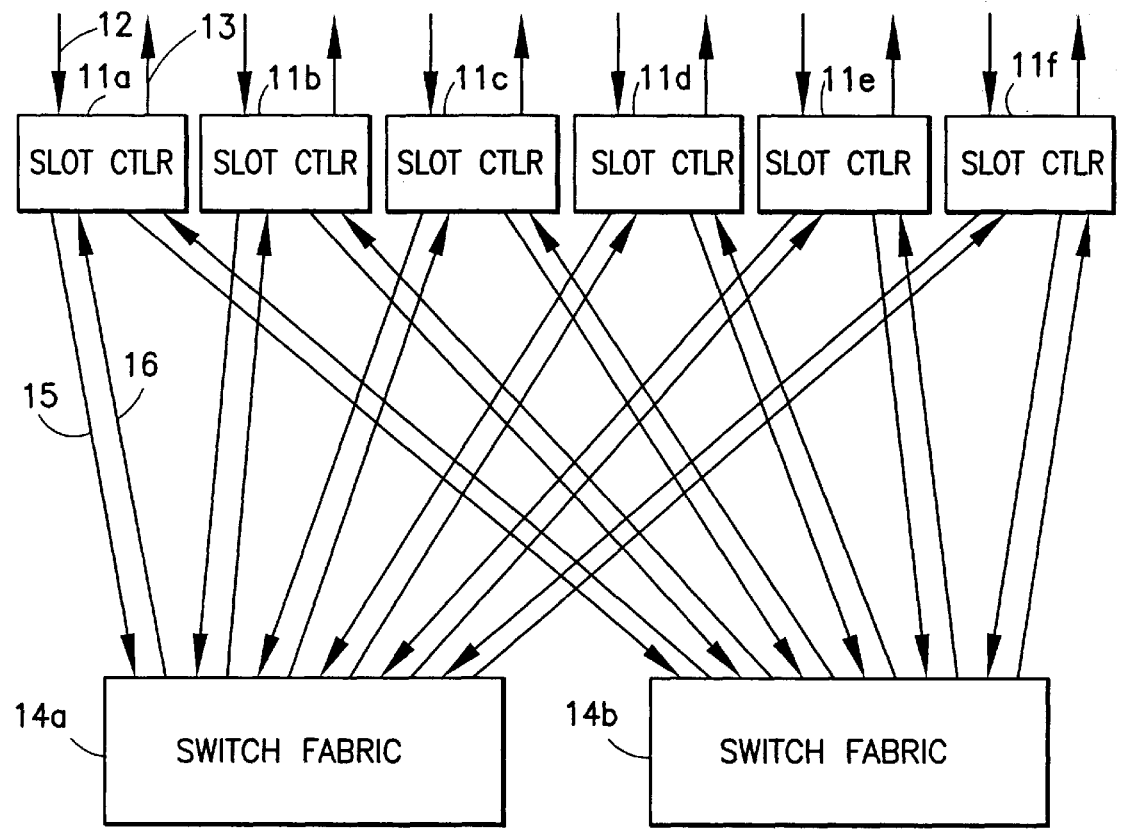
FIG. 1 is a simple diagrammatic representation of a typical ATM switch.
Figure 2:
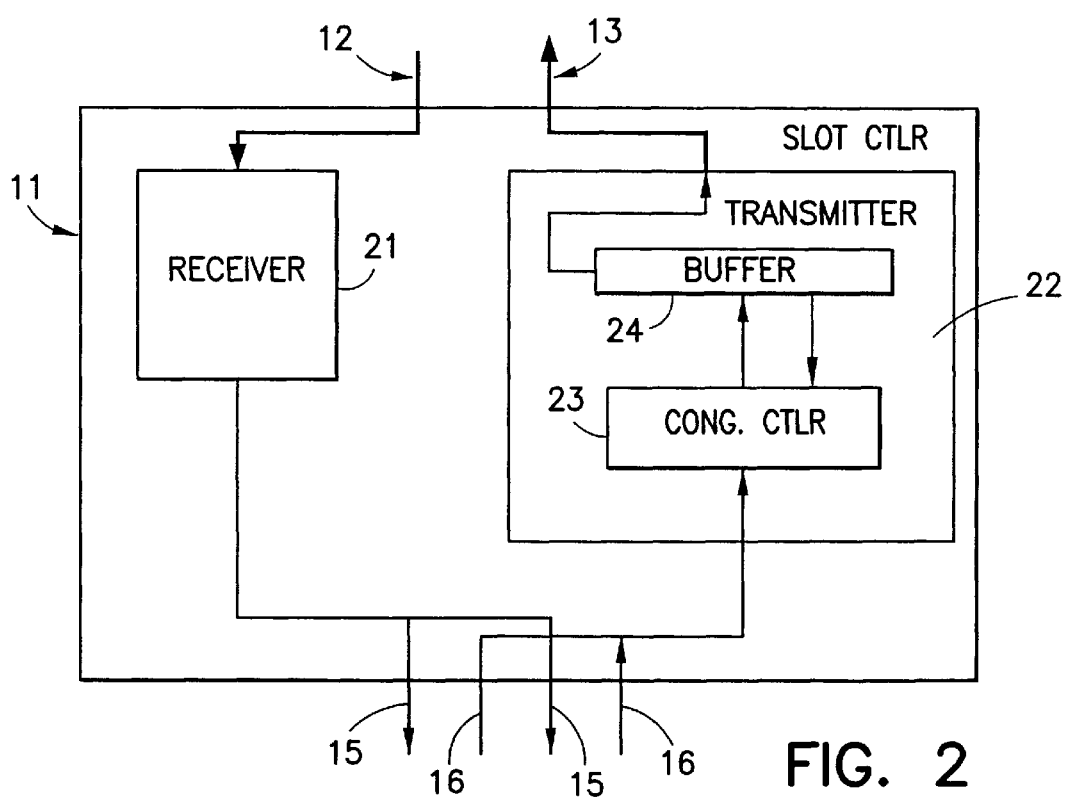
FIG. 2 is an enlarged diagrammatic view of a slot controller forming part of the switch of FIG. 1.

Referring first to FIG. 1, the ATM network switch illustrated is of the type described and claimed in our earlier UK Patent Application No 9507454.8, and has two switch fabrics 14$a$ and 14$b$, each connected to a plurality of slot controllers 11$a$–$f$ (although only six slot controllers are shown to simplify the diagram, a typical switch may have sixteen slot controllers). Each slot controller has input 12 and output 13 connections to an external data link, and includes, as may be seen from FIG. 2, a receiver 21 and a transmitter 22, either or both of which may include a buffer to control the flow of data into or out of the switch. In FIG. 2, the transmitter 22 includes a congestion control mechanism 23 controlling the storage of cells in the buffer 24. The congestion control mechanism 23 is described hereinafter in more detail with reference to FIGS. 3 and 4. Since division is more difficult to execute, the equations $$VcCnt \geq Max' = Max \times \left(1 - \frac{TSC}{BS + K}\right)$$

and $$VcCnt \geq EFCIThr' = EFCIThr \times \left(1 - \frac{TSC}{BS + K}\right)$$

are factored with (BS+K) to give $VcCnt \times (BS+K) \geq Max \times (BS+K-TSC)$ and $VcCnt \times (BS+K) \geq EFCIThr \times (BS+K-TSC)$ so that the elements can be simply arrived at by additions, multiplications and subtractions, as follows.

The number of slots left (Buffer Space or BS) in the buffer 24 is first read on arrival of a new cell at the congestion control means 23 and passed via a multiplexer 30 to an adder/subtracter 31. The VC is determined from the cell header, and the offset K associated with that VC is read from a routing table which may be defined in a separate part of the RAM (Random Access Memory) in which the buffer 24 is configured, the offset K being passed via a second multiplexer 32 to the adder/subtracter 31. The adder then receives an add signal on line 33 and adds the values together, with the resultant BS+K value being stored in a first register 34.

The register 34 then passes the BS+K value back to the first multiplexer 30, while the Total Stored Cells (TSC) value is calculated at 29 from the BS and the total capacity TC of the Buffer and passed to the second multiplexer 32. The values are passed to the adder/subtracter 31, which carries out an A–B operation to give the result BS+K–TSC, which is held in a second register 35.

Additionally, if BS+K–TSC gives a negative value, a negative flag is generated by the adder/subtracter 31 and is held in a register 36 for use as hereinafter described.

The value of Max for the VC is also read from the routing table RAM, and is input to a multiplier 38 in the second stage of the congestion control mechanism (shown in FIG. 3$b$) via a third multiplexer 39, while the value of BS+K–TSC is read from the register 35 to the multiplier 38 via a fourth multiplexer 37. The product MAX(BS+K–TSC) is stored in a register 40.

The EFCI Threshold value is then read from the routing table RAM, and passed via the multiplexer 39 to the multiplier 38, to be multiplied with the BS+K–TSC value, the result being stored in a register 41.

The VcCnt value is read from the routing table RAM and is then passed via multiplexer 37 to the multiplier, and the BS+K value stored in register 34 is fed to the multiplier 38 via multiplexer 39. The product VcCnt(BS+K) is passed to a comparator 43, while the values stored in the registers 40 and 41 are read out to the comparator in turn via multiplexer 42. The respective one-bit flags indicating whether or not the VcCnt product is less than the other side of the equation are stored in registers 44 and 45.

Figure 3A:
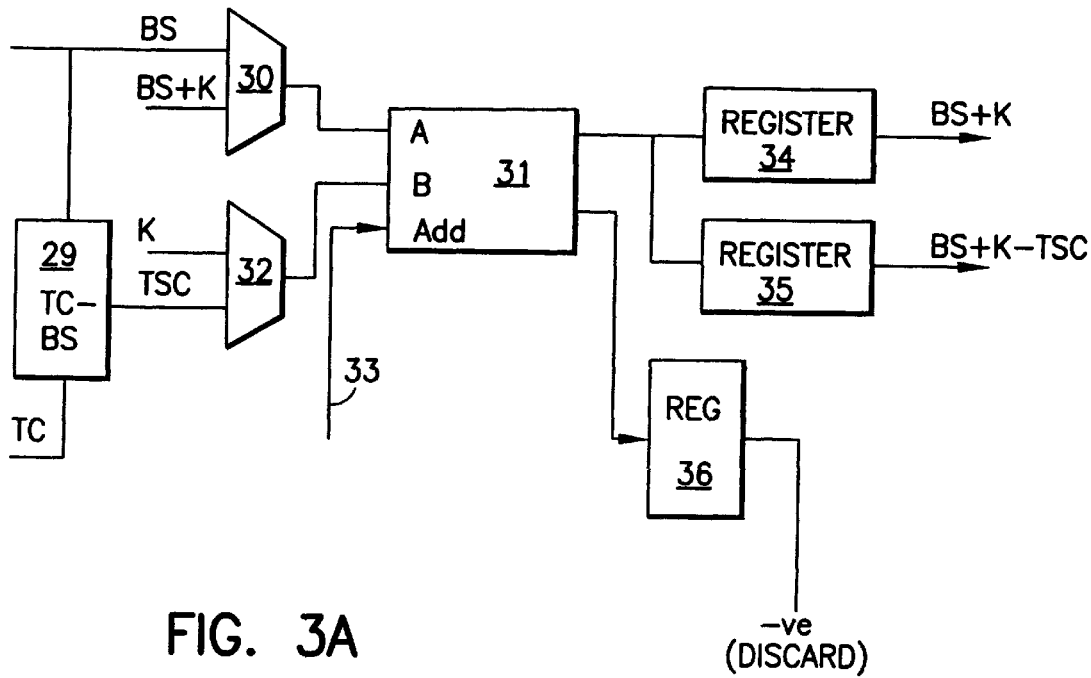
FIG. 3 is a block diagram of the congestion control mechanism in slot controller of FIG. 2.
Figure 3B:
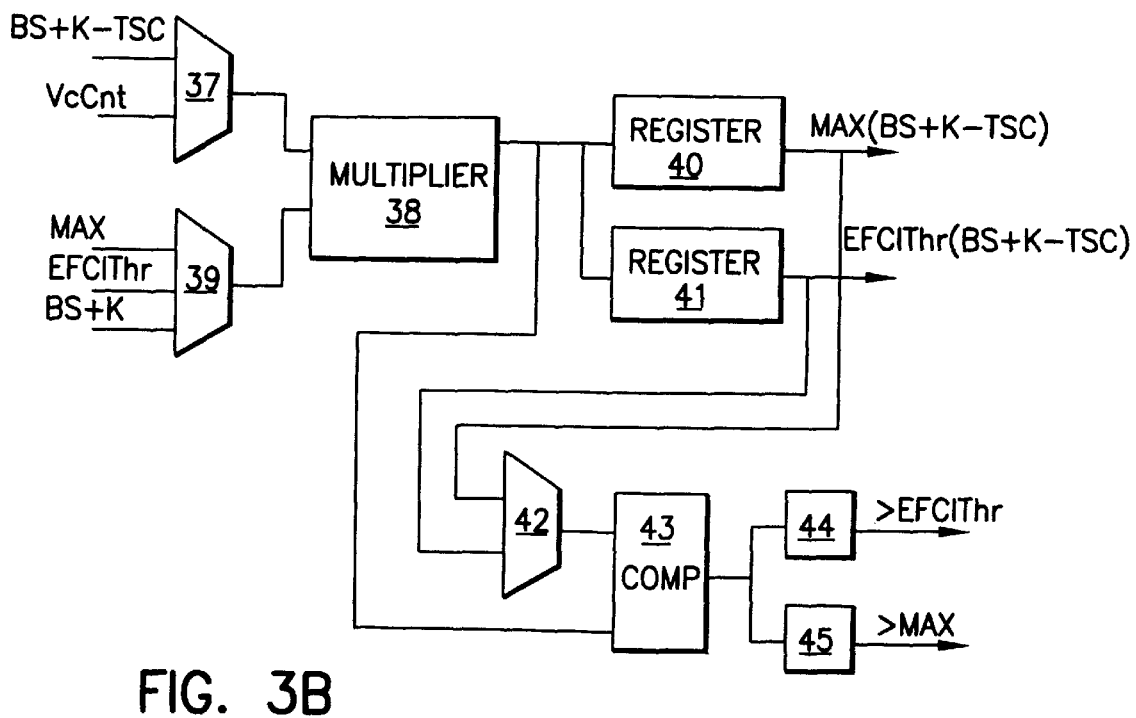
Figure 4:
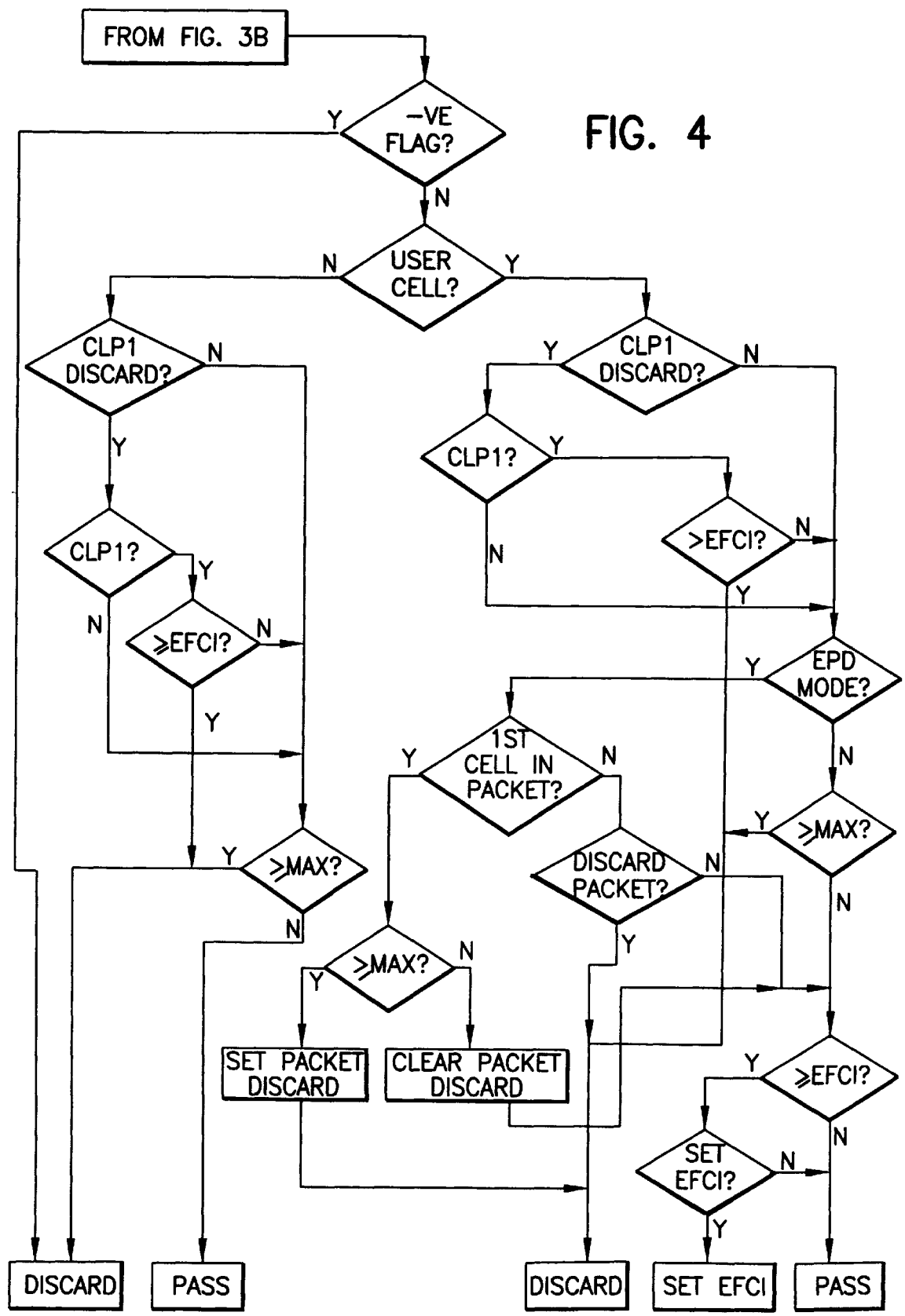
FIG. 4 is a flow diagram illustrating the method steps carried out in the congestion control mechanism.

These flags, together with the negative flag generated in the first stage (illustrated in FIG. 3$a$), are used as the basis for the congestion control processing mechanism illustrated as a flow diagram in FIG. 4.

Referring to FIG. 4, the sequence of operation is as follows. For each VC, various control bits are held in the routing table. These are: (1) Enable EFCI setting; (2) Enable CLP1 setting; (3) Enable Early Packet Discard (EPD); (4) Discard Packet; and (5) First Cell of Packet. On setting up of a VC, the discard packet bit is set to 0 and the First Cell of Packet bit is set to 1 to indicate that the next cell to arrive is the first cell of a packet. In addition to these control bits, the 3-bit Payload Type field in each cell header have to be considered. Bit 2 is set to 0 to signify a user cell, Bit 1 is the EFCI bit, while bit 0 is set to 1 to indicate end of packet.

When the cell arrives at the buffer, the sequence of operations described with reference to FIGS. 3$a$ and 3$b$ is carried out to yield the set of flags as hereinbefore described. These flags are then considered together with the control bits and payload type in the congestion mechanism. If the negative flag is set, the buffer cannot accommodate the cell, and so it is immediately discarded without further processing, and the next cell is received. Another process runs in parallel with the mechanism described. For each cell, the payload type field is checked to see if the cell is the last in a packet, and if it is, the 1st cell in packet bit is set to 1 so that the next cell arriving is set as the first of a packet.

If the negative flag is not set, bit 2 of the PT field of the cell header is checked to see whether the cell is a user cell. Taking the case first where the cell is not a user cell, for example an Rm cell, the routing table control bit for CLP1 Discard is first examined to see whether the cell, if of low priority, can be discarded. If this is not set, the ≧MAX flag is next examined. If it is set, the cell is discarded, while if the flag is not set, the cell is passed and can enter the buffer. If CLP1 discard is set, the next stage is to test whether the cell is of CLP1. If it is not, it can then pass to the ≧MAX test as described above, while if the cell is CLP1, the >EFCIThr test flag is examined. If the threshold is exceeded, the cell is discarded, while if it is not, the ≧MAX flag is examined, as described.

Assuming now that the cell is a user cell, the sequence of operations set out on the right-hand side of FIG. 4 is then followed. Again, the CLP1 discard bit in the routing table for the cell's VC is checked, and if so, the CLP bit is checked. If the VC is not CLP1, the mechanism passes on to the next test, the Early Packet Discard (EPD) Mode test. If the VC is CLP1, the ≧EFCIThr flag is then examined, and if the threshold is exceeded, the cell is discarded, but otherwise the EPD Mode test follows. If CLP1 Discard bit is not set, the mechanism passes direct to the EPD Mode test. The EPD Mode test looks to the routing table to see whether EPD is enabled. If it is not, the ≧MAX flag is examined, and if the value is equalled or exceeded, the cell is discarded, while otherwise the ≧EFCIThr flag is next examined. If the threshold is exceeded, the Enable EFCI setting control bit is checked, and if this is set the EFCI bit in the cell header is set to signal that the rate of sending of cells is to be decreased; otherwise the cell is passed for admittance to the buffer. If the threshold is not exceeded, the cell is passed without further test.

If EPD Mode is enabled for the VC, the First Cell in Packet control bit in the routing table is checked. If this is not set, indicating that the cell is within a packet, the Discard Packet bit is checked; if this is set, the cell can simply be discarded, while if it is not set, the ≧EFCIThr flag is examined, as described in the preceding paragraph. If the cell is the first of a packet, the ≧MAX flag is checked. If the value is equalled or exceeded, the Discard Packet bit is set in the routing table, so that all the cells for that packet are discarded as described; otherwise the Discard Packet bit is cleared and the ≧EFCIThr flag is examined as hereinbefore described.

In practice, it may be found more convenient to-carry out the various tests described with reference to FIG. 4 simultaneously, rather than sequentially, and this may be achieved by a single logic step in which all the inputs are ANDed. The sequential process described, however, assists comprehension of the method of the invention.

What is claimed is:

1. An ATM network switch comprising a buffer means for buffering the flow of ATM cells and a congestion control mechanism comprising:

means for storing tot each virtual connection (VC) through the switch a predetermined value Max, representing the maximum permissible number of ATM cells which may be stored in the buffer means for the VC;

means responsive to the arrival of a new ATM cell at the buffer means for determining the total number of cells TSC currently stored in the buffer means and the number of cells VcCnt stored for the respective VC for the new ATM cell;

means for determining the remaining capacity BS of the buffer means;

calculating means for calculating an adjusted value Max' of Max as a function of TSC and BS; and means for comparing Max' with VcCnt and for discarding the cell it VcCnt is greater than or equal to Max'.

2. A switch according to claim 1, comprising means for storing for each virtual connection (VC) through the switch a predetermined offset value K, which determines the maximum occupancy of the buffer means for the VC, and wherein the calculating means is arranged to calculate Max' in accordance with the formula:

$$\text{Max}' = \text{Max} \times \left(1 - \frac{TSC}{BS + K}\right).$$

3. An ATM network switch comprising a buffer means for buffering the flow of ATM cells and a congestion control mechanism comprising:

means for storing for each virtual connection (VC) through the switch an EFCI (Explicit Forward Congestion Indication) Threshold value for the VC;

means responsive to the arrival of a new ATM cell at the buffer means for determining the total number of cells TSC currently stored in the buffer means and the number of cells VcCnt stored for the respective VC for the new ATM cell;

means for determining the remaining capacity BS of the buffer means;

calculating means for calculating an adjusted value EFCIThr' of the EFCI Threshold EFCIThr as a function of TSC and BS; and means for comparing EFCIThr' with VcCnt and for setting an EFCI bit in the ATM cell header of said cell if VcCnt is greater than or equal to EFCIThr'.

4. A switch according to claim 3, comprising means for storing for each virtual connection (VC) through the switch a predetermined offset value K, which determines the maximum occupancy of the buffer means for the VC, and wherein the calculating means is arranged to calculate EFCIThr' in accordance with the formula:

$$EFCIThr' = EFCIThr \times \left(1 - \frac{TSC}{BS + K}\right).$$

5. A switch according to claim 1, comprising means for establishing an EFCI (Explicit Forward Congestion Indication) Threshold value for the VC, and wherein the calculating means is also arranged to calculate an adjusted value EFCIThr' of the EFCI Threshold in accordance with the formula:

$$EFCIThr' = EFCIThr \times \left(1 - \frac{TSC}{BS + K}\right);$$

and means are provided for comparing the adjusted value of the EFCI Threshold with VcCnt and for setting an EFCI bit in the ATM cell header of said cell if VcCnt is greater than or equal to EFCIThr'.

6. A switch according to claim 3, comprising means for storing for each virtual connection (VC) through the switch a predetermined value Max, representing the maximum permissible number of ATM cells which may be stored in the buffer means for the VC, and wherein the calculating means are arranged to calculate an adjusted value Max' of Max in accordance with the formula:

$$\text{Max}' = \text{Max} \times \left(1 - \frac{TSC}{BS + K}\right);$$

and means for comparing Max' with VcCnt and for discarding the cell if VcCnt is greater than or equal to Max'.

7. A switch according to claim 3, comprising means for determining the Cell Loss Priority (CLP) of the cell and for discarding CLP1 (low loss priority) cells if VcCnt is greater than or equal to EFCIThr'.

8. A switch according to claim 1, comprising means for determining whether the cell is the first of a packet of cells, and means for generating and storing, if VcCnt is greater than or equal to Max', a flag to indicate that all the following cells in the packet are to be discarded.

9. A method of controlling congestion in an ATM network switch, the switch comprising a buffer for buffering the flow of ATM cells therethrough, the method comprising:

storing for each virtual connection VC through the switch a value Max representing the maximum permissible number of ATM cells which may be stored in the buffer for the VC, and an offset value K which determines the maximum occupancy of the buffer for the VC;

determining, upon arrival of each new ATM cell at the buffer, the total number of cells TSC currently stored in the buffer and the number of cells VcCnt stored for the respective VC for the new ATM cell;

determining the remaining capacity BS of the buffer;

calculating an adjusted value Max' of Max in accordance with the formula:

$$\text{Max}' = \text{Max} \times \left(1 - \frac{TSC}{BS + K}\right);$$

and discarding the cell if VcCnt is greater than or equal to Max'.

10. A method of controlling congestion in an ATM network switch, the switch comprising a buffer for buffering the flow of ATM cells therethrough, the method comprising:

storing for each virtual connection (VC) through the switch an EFCI (Explicit Forward Congestion Indication) Threshold value for the VC, and a predetermined offset value K, which determines the maximum occupancy of the buffer for the VC;

determining, upon arrival of each new ATM cell at the buffer, the total number of cells TSC currently stored in the buffer and the number of cells VcCnt stored for the respective VC for the new ATM cell;

determining the remaining capacity BS of the buffer;

calculating an adjusted value EFCIThr' of the EFCI Threshold EFCIThr in accordance with the formula:

$$EFCIThr' = EFCIThr \times \left(1 - \frac{TSC}{BS + K}\right);$$

and comparing EFCIThr' with VcCnt and setting an EFCI bit in the ATM cell header of said cell if VcCnt is greater than or equal to EFCIThr'.

11. A method according to claim 9, comprising storing an EFCI (Explicit Forward Congestion Indication) Threshold value for the VC, and, for each new ATM cell arriving at the buffer, calculating an adjusted value of the EFCI Threshold in accordance with the formula:

$$EFCIThr' = EFCIThr \times \left(1 - \frac{TSC}{BS + K}\right),$$

comparing the adjusted value of the EFCI Threshold with VcCnt and setting an EFCI bit in the ATM cell header if VcCnt is greater than the adjusted value.

12. A method according to claim 10, comprising storing for each virtual connection (VC) through the switch a predetermined value Max, representing the maximum permissible number of ATM cells which may be stored in the buffer for the VC, and, for each new ATM cell arriving at the buffer means, calculating an adjusted value Max' of Max in accordance with the formula:

$$\text{Max}' = \text{Max} \times \left(1 - \frac{TSC}{BS + K}\right),$$

comparing Max' with VcCnt and discarding the cell if VcCnt is greater than or equal to Max'.

13. A method according to claim 10, comprising determining the Cell Loss Priority (CLP) of the cell and discarding CLP1 (low loss priority) cells if VcCnt is greater than the adjusted value of the EFCI Threshold.

14. A method according to claim 9, comprising determining whether the cell is the first of a packet of cells, and, if it is, generating and storing, if VcCnt is greater than Max', a flag to indicate that all the following cells in the packet are to be discarded.

15. In an ATM network switch having a buffer for buffering the flow of ATM cells, a congestion control apparatus comprising:

a) means for storing the maximum number of cells for each virtual connection which may be stored in the buffer;

b) means responsive to the arrival of a new ATM cell for determining the total number of cells currently stored in the buffer and the number of cells stored in the buffer for the virtual connection to which the new ATM cell belongs;

c) means for adjusting the stored maximum number of cells based on the total remaining capacity of the buffer;

d) means for comparing the number of cells stored in the buffer for the virtual connection to the adjusted stored maximum number of cells; and e) means for discarding the cell if the number of cells stored in the buffer for the virtual connection exceeds the adjusted stored maximum number of cells.

16. In an ATM network switch having a buffer for buffering the flow of ATM cells, a congestion control apparatus comprising:

a) means for storing an explicit forward congestion indication threshold value for each virtual connection;

b) means responsive to the arrival of a new ATM cell for determining the total number of cells currently stored in the buffer and the number of cells stored in the buffer for the virtual connection to which the new ATM cell belongs;

c) means for adjusting the stored explicit forward congestion indication threshold value based on the total remaining capacity of the buffer;

d) means for comparing the number of cells stored in the buffer for the virtual connection to the adjusted explicit forward congestion indication threshold value; and e) means for setting an explicit forward congestion indication bit in an ATM cell header if the number of cells stored in the buffer for the virtual connection exceeds the adjusted explicit forward congestion indication threshold value.

17. A switch according to claim 2, comprising means for establishing an EFCI (Explicit Forward Congestion Indication) Threshold value for the VC, and wherein the calculating means is also arranged to calculate an adjusted value EFCIThr' of the EF Threshold in accordance with the formula:

$$EFCIThr' = EFCIThr \times \left(1 - \frac{TSC}{BS + K}\right);$$

and means are provided for comparing the adjusted value of the EFCI Threshold with VcCnt and for setting an EFCI bit in the ATM cell header of said cell if VcCnt is greater than or equal to EFCIThr'.

18. A switch according to claim 4, comprising means for storing for each virtual connection (VC) through the switch a predetermined value Max, representing the maximum permissible number of ATM cells which may be stored in the buffer means for the VC, and wherein the calculating means are arranged to calculate an adjusted value Max' of Max in accordance with the formula:

$$Max' = Max \times \left(1 - \frac{TSC}{BS + K}\right);$$

and means for comparing Max' with VcCnt and for discarding the cell if VcCnt is greater than or equal to Max'.

19. A switch according to claim 4, comprising means for determining the Cell Loss Priority (CLP) of the cell and for discarding CLP1 (low loss priority) cells if VcCnt is greater than or equal to EFCIThr'.

20. A switch according to claim 4, comprising means for determining whether the cell is the first of a packet of cells, and means for generating and storing, if VcCnt is greater than or equal to Max', a flag to indicate that all the following cells in the packet are to be discarded.

21. A method according to claim 11, comprising determining the Cell Loss Priority (CLP) of the cell and discarding CLP1 (low loss priority) cells if VcCnt is greater than the adjusted value of the EFCI Threshold.

22. A method according to claim 12, comprising determining the Cell Loss Priority (CLP) of the cell and discarding CLP1 (low loss priority) cells if VcCnt is greater than the adjusted value of the EFCI Threshold.

23. A method according to claim 11, comprising determining whether the cell is the first of a packet of cells, and, if it is, generating and storing, if VcCnt is greater than Max', a flag to indicate that all the following cells in the packet are to be discarded.

24. A method according to claim 12, comprising determining whether the cell is the first of a packet of cells, and, if it is, generating and storing, if VcCnt is greater than Max', a flag to indicate that all the following cells in the packet are to be discarded.

* * * * *